United States Patent
Pallado et al.

(10) Patent No.: US 6,552,184 B1
(45) Date of Patent: Apr. 22, 2003

(54) PROCESS FOR THE PREPARATION OF AUTOCROSSLINKED COMPOUNDS OF HYALURONIC ACID AND THE DERIVATIVES THEREOF BY THE SUPERCRITICAL ANTISOLVENT TECHNIQUE

(75) Inventors: Paolo Pallado, Abano Terme (IT); Marco Baggio, Abano Terme (IT); Maurizio Dalle Carbonare, Abano Terme (IT); Lanfranco Callegaro, Abano Terme (IT)

(73) Assignee: Fidia Advanced Biopolymer s.r.l., Abano Terme (IT)

( * ) Notice: Subject to any disclaimer, the term of this patent is extended or adjusted under 35 U.S.C. 154(b) by 0 days.

(21) Appl. No.: 09/958,147

(22) PCT Filed: Mar. 30, 2000

(86) PCT No.: PCT/EP00/02814
§ 371 (c)(1),
(2), (4) Date: Nov. 14, 2001

(87) PCT Pub. No.: WO00/61640
PCT Pub. Date: Oct. 19, 2000

(30) Foreign Application Priority Data

Apr. 8, 1999 (IT) .......................................... PD99A0070

(51) Int. Cl.$^7$ .......................... C08B 37/08; C08B 37/00; C07H 7/033

(52) U.S. Cl. ........................ 536/55.3; 536/53; 536/55.1; 536/18.7

(58) Field of Search ........................ 536/53, 55.3, 55.1, 536/124, 123.1

(56) References Cited

U.S. PATENT DOCUMENTS 5,676,964 A 10/1997 Della Valle et al.
5,833,891 A 11/1998 Subramaniam et al.

FOREIGN PATENT DOCUMENTS

WO 96/29998 10/1996
WO 98/08876 3/1998

OTHER PUBLICATIONS

Benedetti et al., Biotechnology and Bioengineering, vol. 53, pp. 232–237, 1997.

Primary Examiner—Samuel Barts
Assistant Examiner—Michael C. Henry
(74) Attorney, Agent, or Firm—Birch, Stewart, Kolasch & Birch, LLP

(57) ABSTRACT

Crosslinked compounds of hyaluronic acid and the derivatives thereof, prepared by the technique of precipitation induced by supercritical antisolvent (SAS), can be used to advantage for the preparation of biomaterials for use in the field of medicine and surgery and in tissue engineering for medical and surgical purposes.

14 Claims, 1 Drawing Sheet

Diagram of the equipment for the conduction of crosslinking tests

Diagram of the equipment for the conduction of crosslinking tests

PROCESS FOR THE PREPARATION OF AUTOCROSSLINKED COMPOUNDS OF HYALURONIC ACID AND THE DERIVATIVES THEREOF BY THE SUPERCRITICAL ANTISOLVENT TECHNIQUE

This application is the national phase under 35 U.S.C. 371 of PCT International Application No. PCT/EP00/02814 which has an International filing date of Mar. 30, 2000, which designated the United States of America and was published in English.

SUBJECT OF THE INVENTION

The present invention describes a process for the preparation of autocrosslinked compounds of hyaluronic acid and the derivatives thereof by the technique of precipitation induced by supercritical antisolvent (SAS).

These crosslinked compounds of hyaluronic acid and the derivatives thereof can be used to advantage for the preparation of biomaterials for use in the field of medicine and surgery and in tissue engineering for medical and surgical purposes.

BACKGROUND OF THE INVENTION

Hyaluronic acid is a heteropolysaccharide composed of alternating residues of D-glucuronic acid and N-acetyl-D-glycosamine. It is a straight-chained polymer with a molecular weight that varies between 50,000 and 13,000,000 Da according to, the source from which it is obtained and the methods of preparation and determination used. It is naturally present in the pericellular gels, in the fundamental substance of connective tissue and in vertebrate organisms, of which it is one of the chief components, in the synovial fluid of joints, in the vitreous humor, in the human umbilical cord tissues and in rooster combs.

Hyaluronic acid plays a vital role in many biological processes such as tissue hydration, proteoglycan organisation, cell differentiation, proliferation and angiogenesis (J. Aigner et al., L. Biomed. Mater. Res. 1998, 42, 172–181).

It is known that hyaluronic acid fractions can be used to facilitate tissue repair, as substitutes for the intraocular fluid, or they can be administered by the intra-articular route to treat joint pathologies, as described in European Patents Nos. 0138572 and 0535200.

Hyaluronic acid plays a fundamental role in the tissue repair process, especially in the early stages of granulation, stabilising the coagulation matrix and controlling its degradation, favouring the recruitment of inflammatory cells such as polymorphonucleate leukocytes and monocytes, of mesenchymal cells such as fibroblasts and endothelial cells and, lastly, orientating the successful migration of epithelial cells.

It is known that the application of hyaluronic acid solutions is able to accelerate healing in patients suffering from sores, wounds and burns. The role of hyaluronic acid in the various stages of the tissue repair process has been described by the construction of a theoretical model by Weigel, P. H. et al.: "A model for the role of hyaluronic acid and fibrin in the early events during the inflammatory response and wound healing", J. Theor: Biol:, 119, 219, 1986.

The use of low-molecular-weight hyaluronic acid fractions for the preparation of pharmaceutical compositions with bone-inducing properties (U.S. Pat. No. 5,646,129) is also known.

Hyaluronic acid derivatives maintain all the properties of the above glycosaminoglycan, with the advantage that they can be processed in various forms and that their solubility and degradation times can be varied according to the percentage of their derivation (EP 0216453 B1).

Moreover, also known are the total or partial esters of hyaluronic acid and the autocrosslinked derivatives of hyaluronic acid, their use in the pharmaceutical and cosmetic fields and in that of biodegradable materials (U.S. Pat. Nos 4,851,521; 4,965,353; 5,676,964).

The process known to date for the preparation of autocrosslinked derivatives of hyaluronic acid has the disadvantage that it is difficult to achieve homogeneous autocrosslinking throughout the mass of the product. Indeed, said process consists in preparing a solution of hyaluronic acid salt with tetrabutylammonium (HA-TBA) in an organic solvent such as N-methyl-pyrrolidone (NMP), dimethylsulfoxide (DMSO) or dimethylformamide (DMF) at a temperature of below 0° C., agitating constantly while a solution of 2-chloro-1-methyl-pyridinium iodide (CMPJ) is added to whichever solvent or organic solvent is being used, the quantity of crosslinking agent being 25% that of the polymer mass. As soon as contact is made, the CMPJ produces crosslinking in the HA-TBA and, as its viscosity increases the solid becomes segregated before the crosslinking agent is homogeneously distributed. It therefore tends to settle preferentially on the solid and is no longer able to penetrate into the solution, leading to uneven crosslinking.

The ability of antisolvent fluids such as carbon dioxide ($CO_2$) to solubilise in organic solvents under increased pressure has been exploited, in the present invention, to try to control the crosslinking reaction which is characterised by very rapid kinetics, especially in the early stage of mixing the reagents.

Rendering liquids far less viscous by swelling them makes it possible to achieve a mixture more rapidly and more efficiently than by the traditional process.

By compressing the antisolvent fluid it is possible to work in a swollen, and therefore dispersed environment and to control the crosslinking reaction once it has begun, slowing it down.

Addition of the crosslinking agent to the swollen mass is very rapid because of a specially designed injection system. Because of the swelling caused by the compressed antisolvent, the agitation of the mass and the fast injection of the crosslinking agent, it is possible to control the rate of crosslinking at the onset at temperatures of between 0 and 20° C., preferably 10° C.

At this temperature, the viscosity of the medium is such as will allow good homogenisation of the mass, unlike in the case of the conventional process that has to be conducted at temperatures of around −20° C.

It is essential to work below precipitation pressure so that the separation of the polymer from the liquid phase occurs through the effect of the crosslinking and is not induced by precipitation due to the antisolvent effect; in the latter case, the crosslinking agent is only able to trigger the reaction superficially because it is unable to penetrate within the precipitate.

DETAILED DESCRIPTION OF THE INVENTION

The present invention describes a process for the preparation of autocrosslinked compounds of hyaluronic acid and the derivatives thereof by means of precipitation using the supercritical antisolvent (SAS) technique.

These crosslinked compounds of hyaluronic acid and the derivatives thereof can be used to advantage for the preparation of biomaterials for use in the medical and surgical fields and in tissue engineering in the medical-surgical field.

BRIEF DESCRIPTION OF DRAWINGS

The equipment used the technique is illustrated in FIG. 1, wherein P=precipitator; PI=$CO_2$ pump; P2=pump for the crosslinking agent; VM1, VM2=millimetric valves for flow adjustment; VNR=cut-off valve; V1=on-off valve; VT1, VT2=three-way valves; A=sampling loop; PE=post-expansion vessel; R=rotameter.

The process according to the present invention involves the following steps:
 a) preparing solutions of quaternary ammonium salt of hyaluronic acid or the derivatives thereof and the crosslinking agent;
 b) loading the solutions of quaternary ammonium salt and crosslinking agent into the precipitator and into the container respectively, the latter being fitted with a pump to suck up the liquid;
 c) adjusting the rotation speed to within a range of 200–1000 rpm, preferably between 250 and 450 rpm;
 d) adjusting the temperature to within a range of –20° C. to 20° C., preferably between 0 and 10° C.;
 e) adjusting the pressure of the fluid to below that of precipitation of the quaternary ammonium salt of hyaluronic acid or the derivatives thereof, which depends upon the solvent and the temperature;
 f) injecting the solution of crosslinking agent into the precipitator at a greater pressure than that present in the precipitator in order to disperse all the crosslinking agent homogeneously in the starting polymer solution;
 g) optionally, injecting a buffer solution into the precipitator;
 h) increasing the temperature to+ between 20 and 50° C., preferably between 15 and 40° C.;
 i) leaving it to react for between two and twelve hours, preferably six hours;
 j) washing the product with a flow of antisolvent at a pressure of between 60 and 150 bar, preferably between 80 and 100 bar;
 k) depressurising and harvesting the product.

Figure 1:
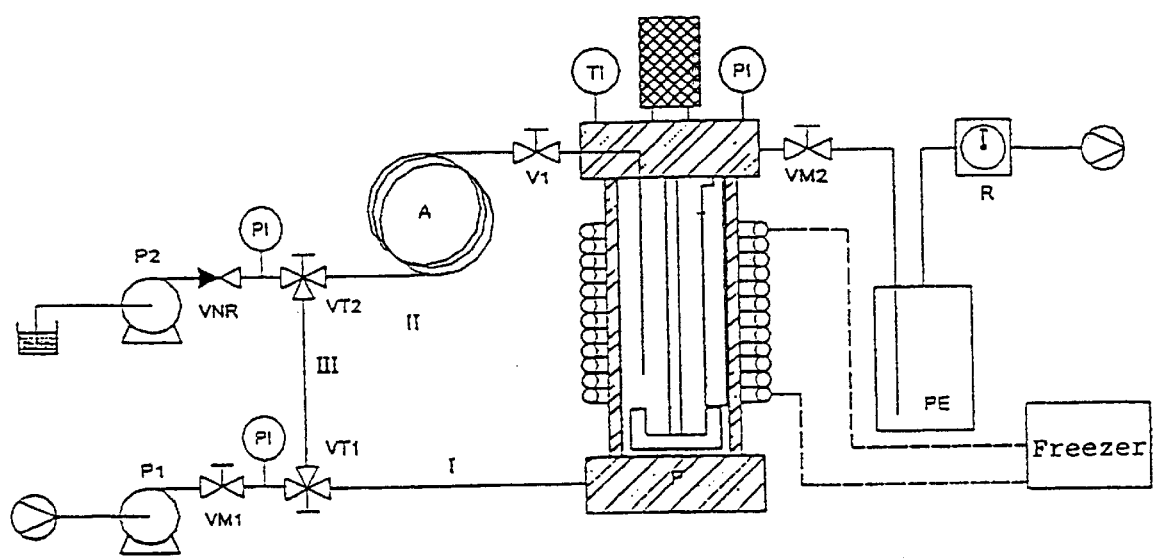

The following hyaluronic acid derivatives are to be preferred:
 partial esters of hyaluronic acid wherein part of the carboxy functions are esterified with alcohols of the aliphatic, aromatic, arylaliphatic, cycloaliphatic, heterocyclic series (EP 0216453 B1);
 partial esters of hyaluronic acid wherein part of the carboxy functions are esterified with an arylaliphatic alcohol and the second part with long-chain, straight aliphatic alcohols with between 10 and 22 carbon atoms (WO 98/08876)
 the partially O-sulfated (WO 95/25751) and/or N-sulfated derivatives (WO 98/45335);
 the amide derivatives of hyaluronic acid.

The preferred quaternary ammonium salts are tetrabutylammonium salts. The crosslinking agents are, for example, 2-chloro-1-methyl-pyridinium iodide, 2-chloro-pyridine, 2-chloro-1-isopropyl-pyridinium iodide, 1-fluoro-2,4-dinitrobenzene.

The solutions are prepared in organic solvents such as N-methyl-pyrrolidone (NMP), dimethylsulfoxide (DMSO), dimethylformamide.

EXAMPLE

Preparation of crosslinked hyaluronic acid starting from solutions of hyaluronic acid salts with tetrabutylammonium The preparation of autocrosslinked hyaluronic acid was conducted starting from solutions of hyaluronic salts with tetrabutylammonium (HA-TBA; the preparation of these salts is disclosed in EP 216.453, EP 342.557 and EP 535.200) in N-methylpyrrolidone (NMP) at a concentration of 15 and 20 mg/ml at two different temperatures. The working conditions during the tests are reported in Table 1.

TABLE 1

Working conditions during the crosslinking tests on a solution of HA-TBA in NMP with the addition of triethylamine to counteract the acidity produced by the reaction

| test | Conc. (mg/ml) | V (ml) | T (° C.) | P (bar) |
| --- | --- | --- | --- | --- |
| 4 | 15 | 100 | 0 | 15 |
| 5 | 20 | 100 | 10 | 20 |

Working Procedure

The solutions containing the polymer and the crosslinking agent are prepared and then loaded into the precipitator and the container connected to the pump, respectively.

The precipitator is made airtight and connected to the supply and outlet system of the apparatus, as well as to the solvent injection line. A mechanical stirrer is then fitted and set at a speed of 400 r.p.m..

The temperature inside the precipitator is maintained at a value within the range of 0 to 20° C., preferably 0° C.:

Once the desired temperature has been reached, loading of the precipitator can begin.

When the pressure has reached the desired value, lower than that required for precipitation, the flow is closed off with the VM1 valve and the system is kept under agitation at a constant pressure.

At this point the pump is activated and begins to suck up the solution containing CMPJ from a tank and force it into the injection line. By operating the three-way valves VT1 and VT2, the flows are switched over so as to place lines I and II in communication with the $CO_2$. The pressure of the line is adjusted to a higher value than that in the precipitator, so as to guarantee conditions for the injection of the entire quantity in the loop. At this point, the VI valve is turned on, allowing the solution with the crosslinking agent to be injected into the pressurised container. This step lasts a fraction of a second, and then the VI valve is shut off.

Keeping the system under stirring, the temperature of the fluid is raised to within a range of 20 to 50° C., preferably 35° C., while the precipitator is emptied to keep the pressure value below that required for precipitation.

Stirring is continued for a period that may vary between 4 and 12 hours, preferably 6 hours, at the desired temperature, to allow complete crosslinking to be achieved by the crosslinking agent, without any precipitation of the solute due to the antisolvent effect.

The precipitation vessel is depressurised by means of the VM2 valve.

The system is left for a few minutes in these conditions, and then the agitation speed is lowered to a value of between 50 and 500 rpm, preferably 200 rpm, and depressurisation is begun by means of the VM2 valve. Once the precipitator has been emptied of all the $CO_2$, it is disconnected from the crosslinking line, which is cleaned with a flow of pure NMP fed through the same pump.

The vessel is then disconnected from the line and the crosslinked polymer is harvested.

The invention being thus described, it is clear that these methods can be modified in various ways. Such modifications are not to be considered as divergences from the spirit and purpose of the invention and any such modification that would appear evident to an expert in the field comes within the scope of the following claims.

What is claimed is:

1. Process for the preparation of autocrosslinked compounds of hyaluronic acid and derivatives thereof by the technique of precipitation induced by antisolvent, comprising the following steps:
   a) preparing solutions of the quaternary ammonium salt of hyaluronic acid or derivatives thereof and a crosslinking agent;
   b) loading the solutions of quaternary ammonium salt and crosslinking agent container being fitted with a pump to suck up the liquid;
   c) adjusting the rotation speed to within a range of 200–1000 rpm;
   d) adjusting the temperature to within a range of −20 to 20° C.;
   e) adjusting the pressure of the fluid to below that required for precipitation of the quaternary ammonium salt of hyaluronic acid or derivatives thereof;
   f) injecting the solution of crosslinking agent into the precipitator at a pressure that is greater than that in the precipitator;
   g) optionally, injecting a buffer solution into the precipitator;
   h) increasing the temperature to a value within a range of 20 to 50° C.;
   i) leaving it to react for between 2 and 12 hours;
   j) washing the product with a flow of antisolvent at a pressure of between 60 and 150 bar;
   k) depressurizing and harvesting the product.

2. Process according to claim 1, wherein the hyaluronic acid derivatives are the partial esters of hyaluronic acid wherein part of the carboxy functions are esterified with alcohols of the aliphatic, aromatic, arylaliphatic, cycloaliphatic, heterocyclic series.

3. Process according to claim 1, wherein the hyaluronic acid derivatives are the partial esters of hyaluronic acid wherein part of the carboxy functions are esterified with an araliphatic alcohol and the second part with straight, long-chain aliphatic alcohols with between 10 and 22 carbon atoms.

4. Process according to claim 1, wherein the hyaluronic acid derivatives are partially O-sulfated and/or N-sulfated derivatives.

5. Process according to claim 1, wherein the hyaluronic acid derivatives are the amide derivatives of hyaluronic acid.

6. Process according to claim 1, wherein the quaternary ammonium salt is tetrabutylammonium salt.

7. Process according to claim 1, wherein the crosslinking agents are chosen from the group consisting of 2-chloro-1-methyl-pyridinium iodide, 2-chloro-pyridine, 2-chloro-1-isopropyl-pyridinium iodide, 1-fluoro-2,4 dinitrobenzene.

8. Process according to claim 1, wherein the solutions are prepared in an organic solvents chosen from the group consisting of N-methyl-pyrrolidone (NMP), dimethylsulfoxide (DMSO), dimethylformamide.

9. The process according to claim 1 wherein in the step c), said rotation speed is adjusted within a range of 250–450 rpm.

10. The process according to claim 1 wherein in the step d), said temperature is adjusted within a range between 0–10° C.

11. The process according to claim 1 wherein in the step h), said temperature is increased to a value within a range between 20–40° C.

12. The process according to claim 1 wherein in the step i), said reaction is lasted for 6 hours.

13. The process according to claim 1 wherein in the step j), said pressure is between 80–100 bar.

14. Process for the preparation of autocrosslinked compounds of hyaluronic acid and derivatives thereof by the technique of precipitation induced by antisolvent, comprising the following steps:
   a) preparing solutions of the quaternary ammonium salt of hyaluronic acid or derivatives thereof and a crosslinking agent;
   b) loading the solutions of quaternary ammonium salt and crosslinking agent container being fitted with a pump to suck up the liquid;
   c) adjusting the rotation speed to within a range of between 250 and 450 rpm;
   d) adjusting the temperature to within a range of −20 to 20° C.;
   e) adjusting the pressure of the fluid to below that required for precipitation of the quaternary ammonium salt of hyaluronic acid or derivatives thereof;
   f) injecting the solution of crosslinking agent into the precipitator at a pressure that is greater than that in the precipitator;
   g) optionally, injecting a buffer solution into the precipitator;
   h) increasing the temperature to a value within a range of between 15 and 40° C.;
   i) leaving it to react for between 2 and 12 hours;
   j) washing the product with a flow of antisolvent at a pressure of between 60 and 150 bar;
   k) depressurizing and harvesting the product.

* * * * *